United States Patent [19]
Hulbert

[11] Patent Number: 5,132,024
[45] Date of Patent: Jul. 21, 1992

[54] HYDRO-CYCLONE UNDERFLOW MONITOR BASED ON UNDERFLOW SLURRY STREAM SHAPE

[75] Inventor: David G. Hulbert, Randburg, South Africa

[73] Assignee: Mintek, Randburg, South Africa

[21] Appl. No.: 618,088

[22] Filed: Nov. 26, 1990

Related U.S. Application Data

[63] Continuation-in-part of Ser. No. 430,259, Oct. 20, 1989, abandoned.

[30] Foreign Application Priority Data

Oct. 26, 1988 [ZA] South Africa ............... 88/8013

[51] Int. Cl.⁵ ............................................. B01D 17/12
[52] U.S. Cl. ...................................... 210/739; 73/227; 73/281; 73/865.9; 209/211; 209/499; 209/546; 210/87; 210/787; 210/512.1; 241/34; 340/606
[58] Field of Search .................. 73/865.9, 227, 281, 73/861.73; 209/211, 546, 552, 499; 210/87, 512.1, 739, 787; 340/606; 241/34

[56] References Cited

U.S. PATENT DOCUMENTS

| | | | |
|---|---|---|---|
| 3,114,510 | 12/1963 | McCarty et al. | 241/34 |
| 4,246,576 | 1/1981 | Grieve et al. | 241/34 |
| 4,441,102 | 4/1984 | Webb | 340/606 |
| 4,587,024 | 5/1986 | Hayatdavoudi | 210/739 |
| 4,905,897 | 3/1990 | Rogers et al. | 340/606 |
| 5,026,486 | 6/1991 | Wikdahl | 210/787 |

FOREIGN PATENT DOCUMENTS

| | | | |
|---|---|---|---|
| 2100280 | 7/1972 | Fed. Rep. of Germany | 73/865.9 |
| 55-35280 | 3/1980 | Japan | 73/227 |
| 63-75220 | 4/1988 | Japan | 340/603 |
| 543410 | 3/1977 | U.S.S.R. | 209/211 |
| 881692 | 3/1979 | U.S.S.R. | 209/211 |
| 874099 | 4/1979 | U.S.S.R. | 210/87 |

OTHER PUBLICATIONS

Engineer in Training Review Manual, Sixth Edition, Lindeburg, 1982, pp. 1-12, 209-211.
Publication—"Cyclone Circuits", Steel & Coal, Nov. 23, 1963, vol. 187, No. 4975, Abbott, pp. 1012-1015, 209-211.

*Primary Examiner*—Robert A. Dawson
*Assistant Examiner*—Joseph Drodge
*Attorney, Agent, or Firm*—Mason, Fenwick & Lawrence

[57] ABSTRACT

A method is disclosed of controlling the operation of a hydro-cyclone or a circuit embodying same. The method involves the measurement of a variable associated with the shape of the slurry underflow emanating from the hydro-cyclone outlet. The variable is generally the cone angle or, in effect, the radius or diameter of the conical shaped stream of slurry flowing from the outlet at a selected position below the outlet and this diameter can be measured using an arm or arms which operatively rides on the outer boundary of the slurry underflow stream.

7 Claims, 4 Drawing Sheets

5,132,024

HYDRO-CYCLONE UNDERFLOW MONITOR BASED ON UNDERFLOW SLURRY STREAM SHAPE

This application is a continuation-in-part application of U.S. application Ser. No. 07/430,259 filed on Oct. 20, 1989.

FIELD OF THE INVENTION

This invention relates to a hydro-cyclone underflow monitor and, more particularly, a monitor which is adapted to monitor either the radius of the stream of slurry or liquid emanating from an underflow outlet at a suitable position below such outlet or a variable associated with such radius, with a view to acquiring information as to density, flow rate, solid particle size or other variable dependent on, or affecting the performance of a hydro-cyclone or circuit embodying same, or any combination of such variables.

BACKGROUND TO THE INVENTION

Hydro-cyclones are widely used in the metallurgical industry for the separation of particles in a slurry according to their size and/or density. Common on-line measurements used in connection with the operation of hydro-cyclones are the flow rate and density of the slurry being fed to the hydro-cyclone and the inlet pressure of such slurry.

As is well known, the proper operation of a hydrocyclone depends on a suitable rotational motion of slurry inside the cyclone, with a core of air along its axis. This rotational motion is also imparted to the underflow of the cyclone, so that the combined axial and radial velocities of this exiting stream result in a spray of nearly conical shape. When a hydro-cyclone is overloaded, the rotational motion of the slurry in the cyclone is altered such that the radial velocity of the slurry emerging from the cyclone as an underflow stream is small compared with its axial velocity, the air core also is disturbed, and a slender rope-shaped discharge or a blockage results.

The actual shape of the hydro-cyclone underflow stream is approximately conical and has therefore a radius at any suitable position below the underflow outlet itself. This radius varies with changes in the variables associated with its operation.

This characteristic has been used to a very limited extent in the past to control the operation of a hydrocylone, or at least to shut it down or provide an alarm when the shape of the underflow stream corresponds to undesirable operation.

Thus, for example, there is described in U.S. Pat. No. 4,246,576 to Grieve et al, a monitor which is, in effect, a transition detector, and which provides an output indicating simply whether the underflow is "normal" or "abnormal". In effect this monitor simply acts as a switch indicating either of two conditions of the underflow.

U.S. Pat. No. 3,114,510 to McCarthy and Curtis describes another form of underflow monitor which simply determines whether or not the shape (radius) of the underflow is between two limits corresponding to "underload" and "overload". In other words, this monitor simply detects whether or not the shape of the underflow is anywhere within a desired operating range.

As well as reacting to loading, a hydro-cyclone reacts to different compositions of the feed slurry, and the shape of the underflow stream varies accordingly. It has now been found that a most useful method and means of controlling the operation of a hydro-cyclone or circuit embodying same, can be provided by monitoring the shape of the underflow stream over a continuous desired operating range to provide either a digital or analogue control signal.

It is, accordingly, the object of this invention to provide a method of controlling the operation of a hydrocyclone, or, alternatively, a circuit of which a hydrocyclone is a component part, in which the shape, or a variable associated with the shape of the underflow slurry from the hydro-cyclone is employed as a measured control variable.

In this specification the term "control" is intended to include the measurement of variables in the system, such as measurement of particle size, flow rates, and other variables.

SUMMARY OF THE INVENTION

In accordance with this invention there is provided a method of controlling the operation of a hydro-cyclone, or, alternatively, a circuit embodying a hydro-cyclone, the method of control including the monitoring, over a continuous desired operating range, of a variable related with the radius or fluctuations in radius of the slurry underflow stream emanating from the hydrocyclone underflow outlet, and processing the value of the monitored variable to provide an output signal dependent on the operating conditions of the hydrocyclone or circuit embodying same within said operating range.

Further features of the invention provide for the variable associated with the shape of the slurry underflow emanating from the hydro-cyclone underflow outlet to be the radius, diameter, or cone or other angle or fluctuation, or any of these, of the generally roughly conical configuration described by the outer boundary of the underflow slurry stream at a position a predetermined distance below the underflow outlet; and for such radius, diameter or angle, or fluctuations thereof, to be detected by employing a substantially abrasion resistant element adapted to "ride" on the outer boundary region of the underflow slurry stream, such element being carried at the end of a downwardly extending, and generally pivotally mounted arm, or arms, in which case the value of the radius or diameter or fluctuations thereof is detected by determining the angle at which the arm or arms extend.

In the case of the use of an abrasion resistant element carried on a downwardly extending arm, the arm is preferably urged towards the underflow stream at the required position by means of gravity acting directly thereon a counterweight or, alternatively, a suitable spring.

However, it is also acknowledged that such measurement can be made by contactless methods, for example using the ultrasound based echo technique, or optical techniques.

Variations over a continuous range, in a variable feature of the shape of the underflow of a hydrocyclone as envisaged by this invention may be used in a number of different ways as follows :

(i) The measurement of such a variable property of the underflow of the hydro-cyclone could be used in a scheme which constrains one or more control actions so as to allow operation of the cyclone over a range bounded by, but not including, an undesirable form of underflow. In this regard it is to be noted that the undesirable forms of underflow employed in the past do not provide with any degree of accuracy or finesse in view of the fact that only excessive or large changes are detected.

(ii) The use of such an underflow measurement may be employed as a control variable in a milling circuit to aid the optimisation of its operation. In this regard it could, it is believed, beneficially replace the measurement of the primary cyclone feed flow rate in, for example, a multi-variable control scheme.

(iii) The monitoring of the underflow in the manner envisaged could be employed in such a way as to provide a high-density recycled feed to a mill. This may be employed to facilitate a better control of the total inflow of feed water to a mill in conjunction with the a controlled addition of dilution water. It may be that such a monitoring of the underflow stream shape could enable a controlled roping of the underflow to be employed.

(iv) The proposed underflow measurement could be employed to infer size characteristics of overflow material, possibly in conjunction with the cyclone feed measurement and optionally some other related measurements.

(v) The measured property associated with the shape of the underflow could, either alone, or in conjunction with cyclone feed measurements, be employed to infer density, viscosity, or flow rate of the underflow for the purposes of control.

In order that the invention may be more fully understood, different embodiments and an actual test carried out thereof will now be described with reference to the accompanying drawings.

DETAILED DESCRIPTION WITH REFERENCE TO THE DRAWINGS

Figure 1:
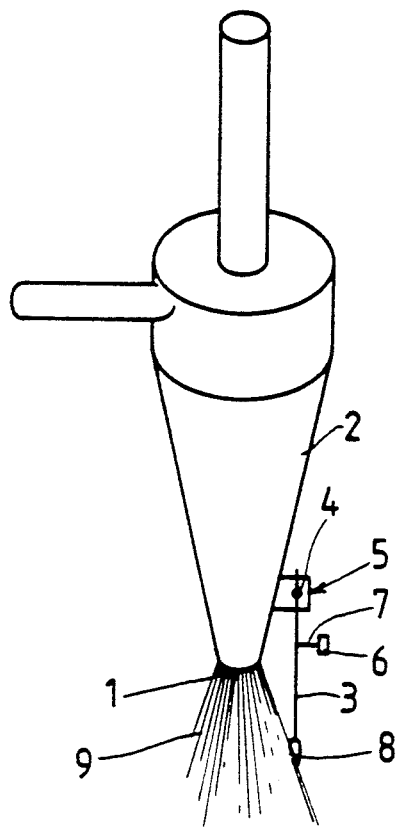
FIGS. 1 to 3 are each a schematic illustration of means for detecting the radius of the underflow slurry stream emanating from a hydro-cyclone underflow outlet at a position spaced downwardly from the outlet itself.

As illustrated in FIG. 1 there is associated with the underflow outlet 1 of a hydro-cyclone 2, a depending arm 3 mounted towards its upper end on a pivot 4, with which is associated an angle detector 5.

A counterweight 6 is carried on an outwardly projecting intermediate lateral arm 7 and the lowermost end of the downwardly extending arm 3 is provided with an abrasion resistant tip 8.

The tip 8, and counterweight as well as the other design variables of the arm arrangement are such that the abrasion resistant tip rides on the outer boundary of the generally conical shaped outlet stream 9 of slurry at a position spaced downwardly from the underflow outlet 1 such that the angle of the arm 3 will provide a measure of the diameter of the underflow stream 9 at said position below the outlet.

Accordingly, the angle detected by the angle detector 5 can be employed as the measured variable in the manner outlined above.

Figure 2:
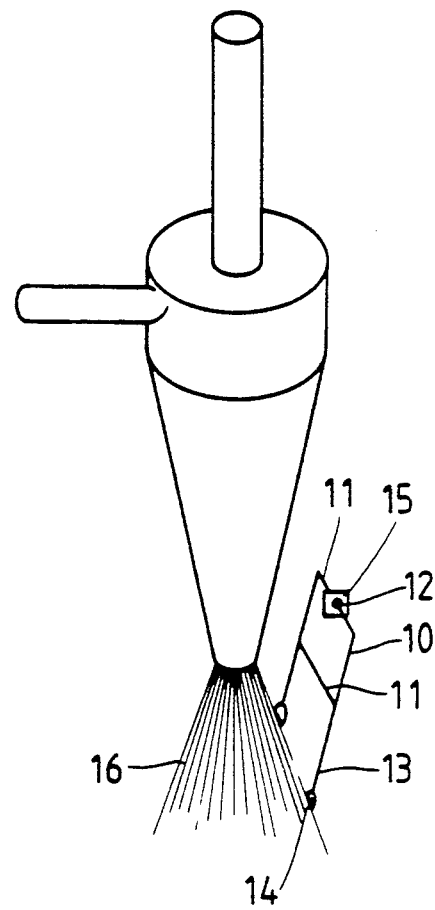

Turning now to FIG. 2, there is provided an alternative arrangement in which a pair of parallel arms 10 are held in a freely hinged parallelogram configuration by two transverse parallel arms 11 spaced apart, and the uppermost of which is pivotally supported at a position 12 such that, as described above in relation to FIG. 1, the arms depend.

Each of the parallel arms 10 has lower extended end regions 13 each of which carry at their lowermost ends abrasion resistant pads 14 of the nature described above.

Once again, in use, an angle detector 15 is used to detect the angle of inclination of the uppermost transverse arm 11 and the pads 14 of abrasion resistant material are supported on the conical flowing stream 16 of underflow slurry, in use.

Figure 3:
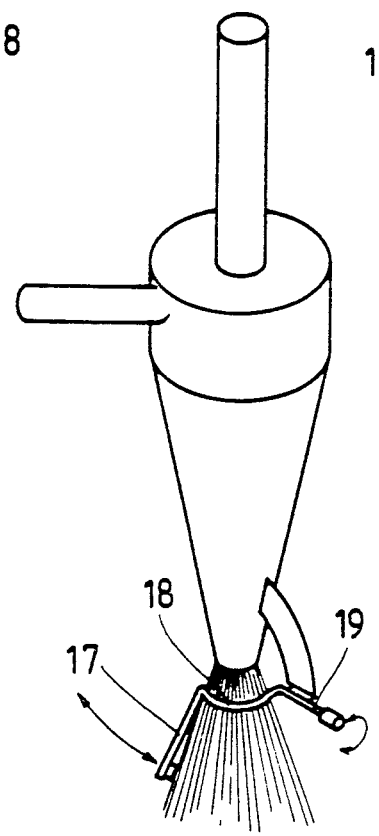

In the case of the embodiment of the invention illustrated In FIG. 3, the arm 17 is carried at one end of a carrier 18 extending about the outer zone of the underflow (and out of contact therewith) for 90° of arc around the axis of the cyclone. The carrier terminates at its other end in a pivot 19 extending radially outwardly with respect to the cyclone axis. In this case the pivot's rotation or angular position is a direct measure of the change in radius of the underflow or cone angle thereof.

It will be appreciated that numerous different methods of determining characteristics of the shape of the underflow stream of slurry can be employed and these include the use of electromagnetic radiation, for example light and laser beams, in conjunction with shadowing, attenuation, reflection, or any form of imaging process, as well as any position detection utilising ultrasonics.

Various tests have been conducted in order to ascertain performance of the invention in relation to an industrial milling circuit.

Figures 4A, 4B, 4C, 4D:
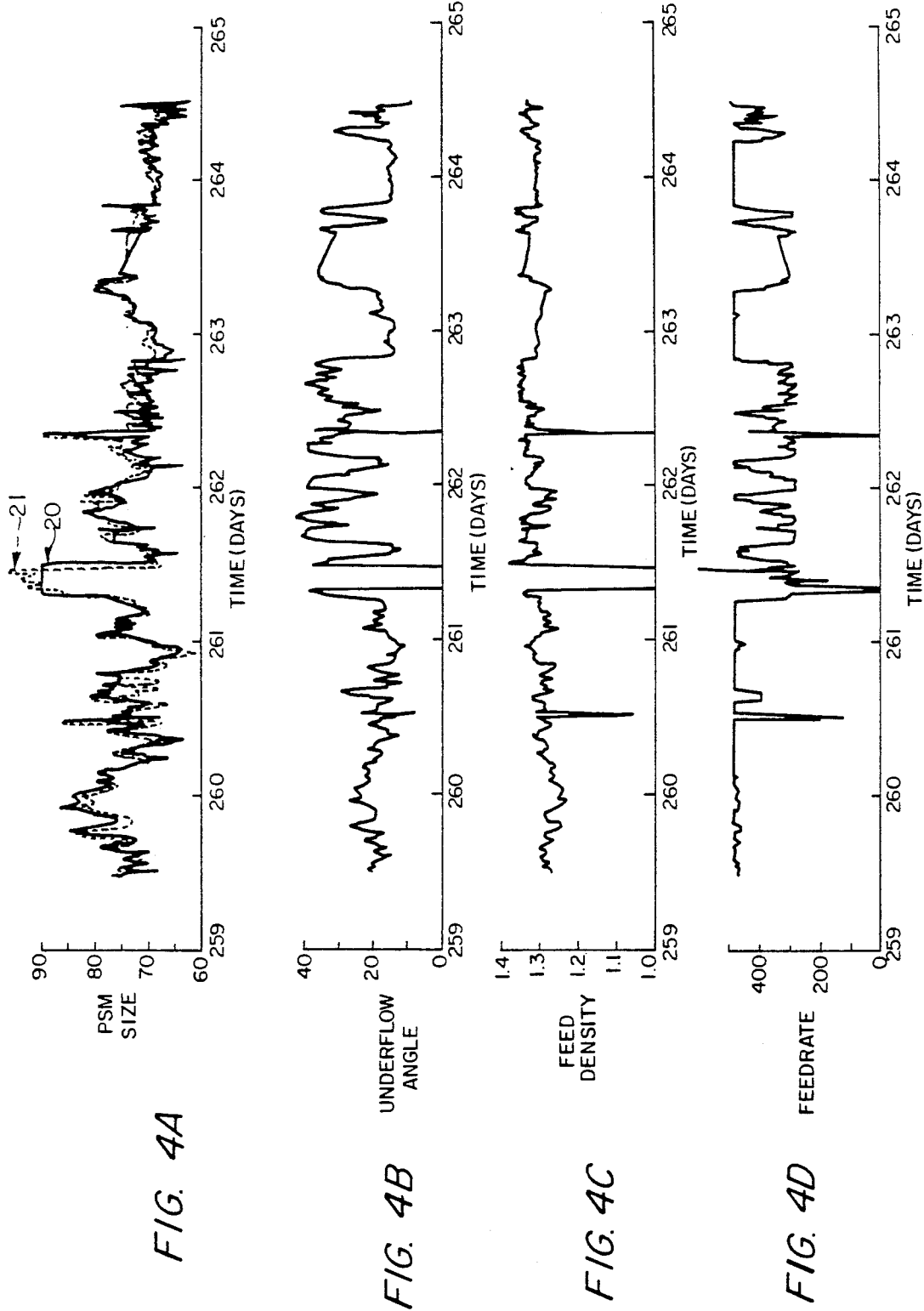
FIGS. 4(A-D) reproduce a set of recorded charts of certain variables in an industrial milling circuit in which the expedient of this invention was employed to provide a modelled particle size.
Figure 5A:
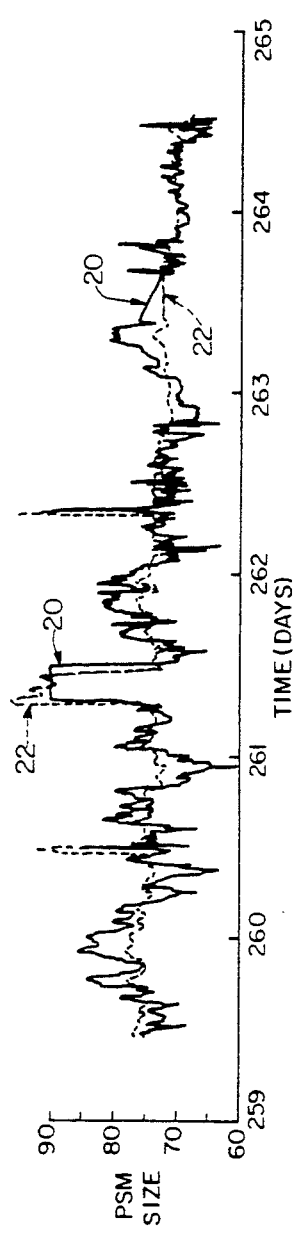
FIGS. 5(A-D) are the same as FIGS. 4(A-D) but employing the best alternative modelled particle sizes which applicant was able to achieve without the expedient of this invention; and, FIGS. 6A and 6B reproduce recorded charts of a test in which the expedient of this invention was employed to control the feedrate to a hydro-cyclone in an industrial milling circuit by a normal control loop.

Firstly, referring to FIGS. 4(A-D) and 5(A-D), there are reproduced, a set of recorded charts over a period of five days and reflecting four different variables. FIGS. 4A and 5A reflect the particle size (as represented by the percentage of material less than 75 microns), FIGS. 4B and 5B a signal linearly related to the radius of the underflow slurry stream which is recorded as an underflow angle in view of the method of operation of the detectors described above; FIGS. 4C and 5C reflect the feed density as independently determined by conventional techniques, and FIGS. 4D and 5D reflect a feed rate as determined by conventional techniques.

In the case of FIG. 4A, reflecting particle size, has two separate closed lines formed thereon, the one (shown solid) indicated by numeral 20 being the actual measured particle size derived from a conventional particle size monitor, and the other 21 (shown dotted), showing the particle size derived using a measurement according to the invention. This modelled line 21 was obtained by plotting according to the best model fitted, which applicant was able to derive, according to the formula:

$$\text{size} = 0.58 \times \text{angle} - 115 \times \text{density} + 0.020 \times \text{feed rate} - 201.$$

It will be noted that the modelled line fits the measured line extremely well on average and, indeed, it is considered to be more than adequately close enough to the actual measured value to be employed as a control means.

Figure 5B:
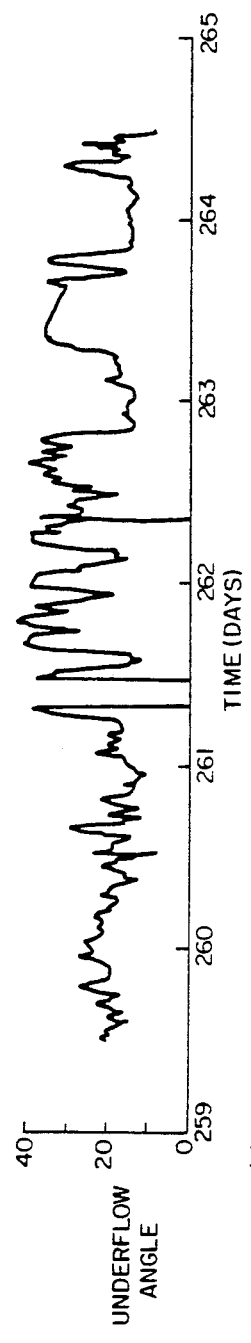
Figure 5C:
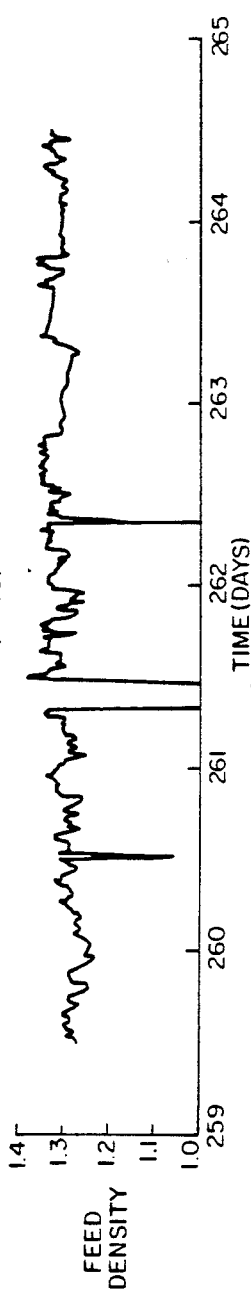
Figure 5D:
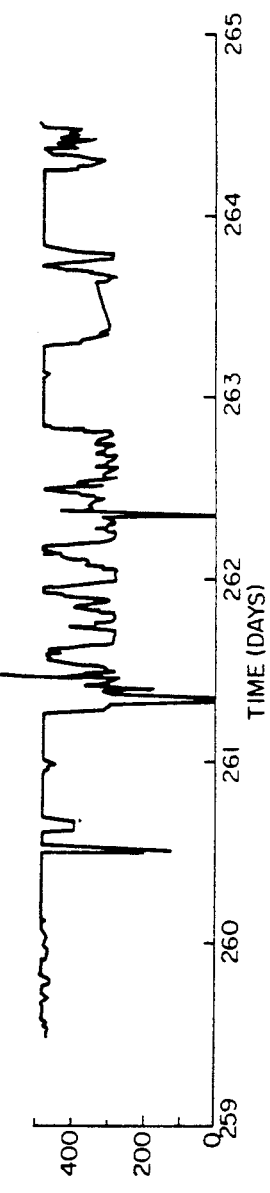

Compared to this, in FIG. 5B, and where the underflow angle was not employed in the derivation of the modelled line 22, the best fit that could be obtained was according to the formula:

size = −50×density−0.018×feed rate+linear drift.

It can be seen that this modelled line is substantially inferior to that shown in FIG. 4A particularly where relatively small changes in the particle size are measured. Clearly the derivation of the modelled particle size employing the expedient of this invention is far superior. In reality, this means that the radius (or angle) of the underflow slurry stream could be employed instead of a particle size monitor thereby providing an extremely simple piece of equipment to replace an extremely costly automatic particle size monitor.

Figure 6A:
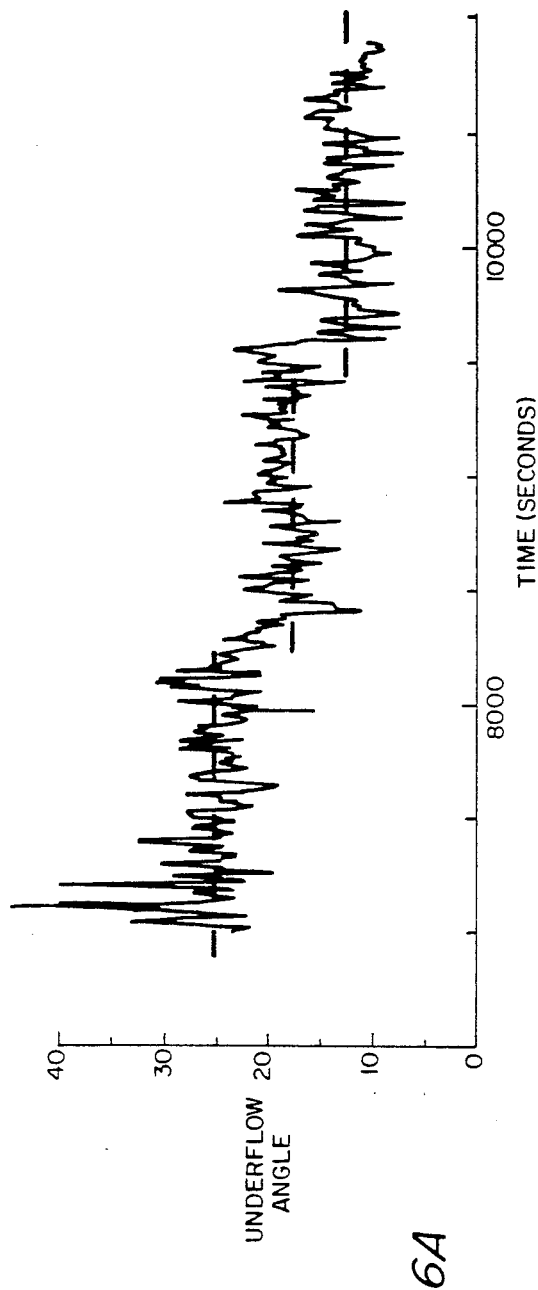
Figure 6B:
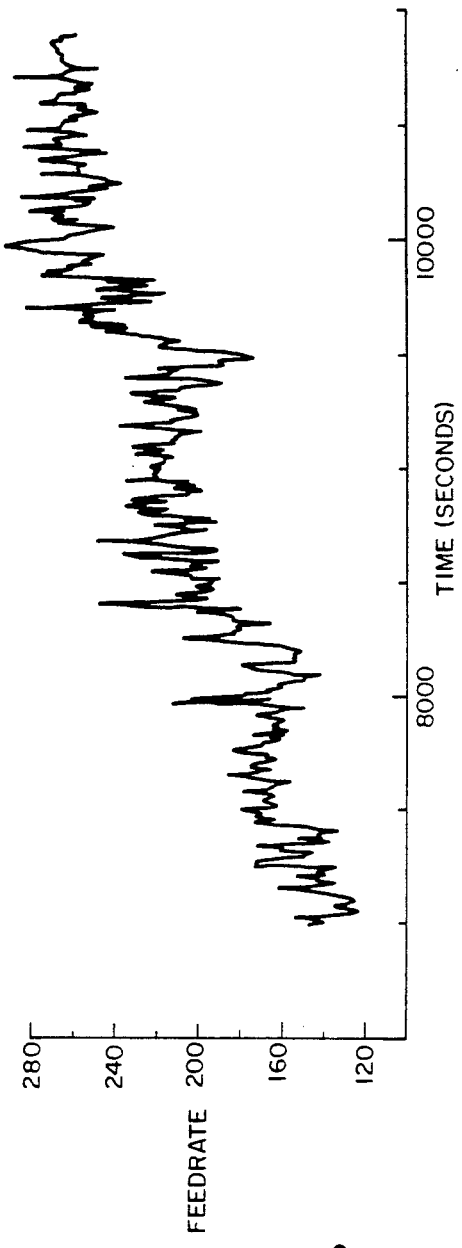

FIGS. 6A and 6B illustrate recorded charts of the underflow slurry stream angle where it was employed to control the feed rate to a hydro-cyclone in a conventional industrial milling circuit by means of a normal control loop. The tests were conducted at three set points which are shown by heavy dotted lines and the chart of feed rate shows the manner in which such feed rate was controlled in consequence of variations in underflow angle. A highly satisfactory result was achieved.

It will accordingly be appreciated that the invention provides an extremely simple method and means of monitoring the shape of the underflow stream of slurry material emanating from a hydro-cyclone which can be employed for the purposes of controlling a cyclone operation or a circuit in which a cyclone is located, such control generally being effected in combination with other required measurements.

What we claim as new and desire to secure by Letters Patent is:

1. A method of controlling the operation of a hydro-cyclone or of a system incorporating a hydro-cyclone, wherein the hydro-cyclone has an underflow axial outlet and a substantially conical slurry underflow stream emanating from the underflow outlet, wherein a plurality of variables are associated with the operation of the hydro-cyclone, and wherein the shape of the slurry underflow stream varies with changes in the variables associated with the operation of the hydro-cyclone, said method comprising the steps of:

providing an arm at least a portion of which extends downwardly alongside the slurry underflow stream and a substantially abrasion resistant element at an end of the arm, wherein the element is adapted to operatively ride on the outer boundary of the underflow slurry stream at a predetermined axial distance from the underflow outlet;

monitoring at least one of the variables associated with the operation of the hydro-cyclone over a continuous desired operating range by continuously measuring the radius or diameter of the underflow slurry stream a the predetermined distance from the underflow outlet using the element, the monitored variable having a value associated therewith; and processing the value to provide an output signal dependent on the operating conditions of the hydro-cyclone or the system incorporating the hydro-cyclone.

2. The method of claim 1, wherein in said monitoring step, the monitored variable is the changes in radius or diameter of the slurry underflow stream and is detected by determining the angle at which the arm extends relative to a fixed reference angle.

3. The method of claim 2, further comprising the step of providing a counterweight operatively connected to the arm, and wherein in said monitoring step, the arm is urged towards the slurry underflow stream by the counterweight.

4. The method of claim 1, wherein said method is applied to the control of a milling circuit incorporating a hydro-cyclone and further comprises the step of deriving a parameter describing particle size from the measured variable.

5. The method of claim 1, wherein said method is applied to the control of a milling circuit incorporating a hydro-cyclone and further comprises the step of using the output signal to control the feed rate of material to the hydro-cyclone.

6. A hydro-cyclone having a plurality of variables associated with its operation, said hydro-cyclone comprising:

a chamber means for receiving a slurry, said chamber means including an underflow axial outlet means for release of a substantially conical shape slurry underflow stream, wherein the shape of the slurry underflow stream varies with changes in the variables associated with the operation of the hydro-cyclone, and wherein the slurry underflow stream has a plurality of measurable features which vary with its shape; and measuring means for measuring at least one features of the slurry underflow stream which varies with its shape comprising an element adapted to operatively ride on the outer boundary of the stream at a predetermined axial distance from the underflow outlet.

7. The hydro-cyclone of claim 6, wherein said measuring means further comprises an arm extending downwardly, wherein said element comprises a substantially abrasion resistant element at the end of the arm.

* * * * *